(No Model.) 2 Sheets—Sheet 1.

G. G. SEEGER.
HARROW.

No. 331,749. Patented Dec. 1, 1885.

WITNESSES
Wm T Gill
Geo. Cook

INVENTOR
Geo. G. Seeger
By H. A. Seymour ATTORNEY (No Model.)  2 Sheets—Sheet 2.

G. G. SEEGER.
HARROW.

No. 331,749.  Patented Dec. 1, 1885.

WITNESSES
Wm. T. Gill
Geo Cook.

INVENTOR
Geo. G. Seeger
by H. A. Seymour ATTORNEY

N. PETERS. Photo-Lithographer, Washington, D. C.

UNITED STATES PATENT OFFICE.

GEORGE GUSTAVE SEEGER, OF HILLSDALE, IOWA.

HARROW.

SPECIFICATION forming part of Letters Patent No. 331,749, dated December 1, 1885.

Application filed July 29, 1884. Serial No. 139,673. (No model.)

*To all whom it may concern:*

Be it known that I, GEORGE G. SEEGER, of Hillsdale, in the county of Mills and State of Iowa, have invented certain new and useful Improvements in Harrows; and I do hereby declare the following to be a full, clear, and exact description of the invention, such as will enable others skilled in the art to which it appertains to make and use the same.

My invention relates to an improvement in harrows, the object being to provide a device of this character which shall be adapted to be used on both sides of a ridge, and which shall be so constructed that it may be adjusted to upturn the earth on adjacent sides of opposite ridges, at the same time providing means for preventing damage to the plants, which are in this instance arranged in hills between the ridges.

With this end in view my invention consists in certain novel features of construction and combinations of parts, as will be hereinafter described, and pointed out in the claims.

Figure 1:
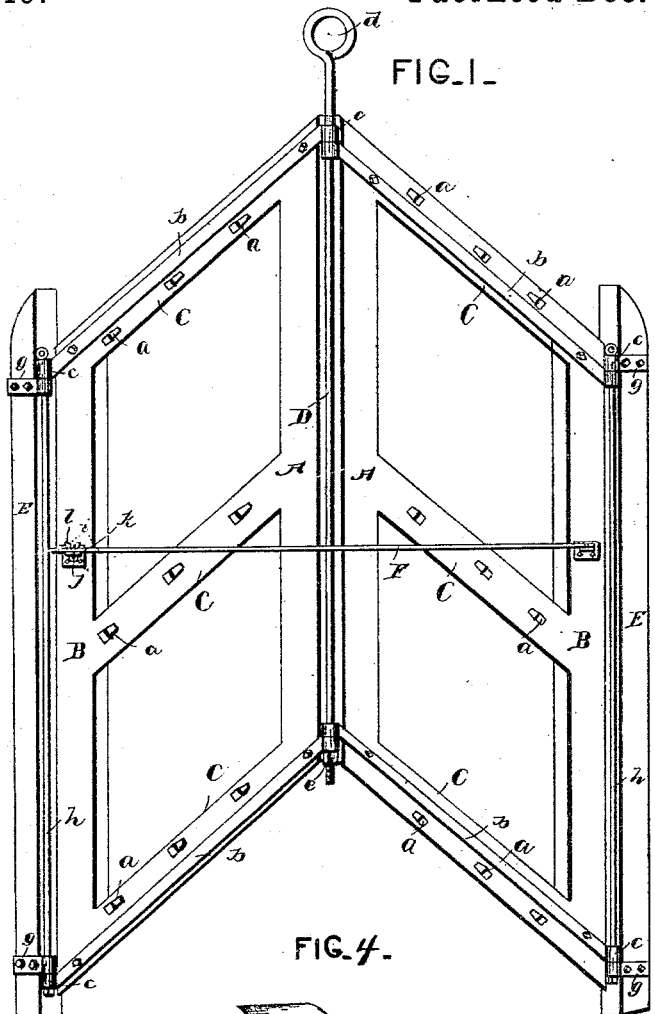
Figure 4:
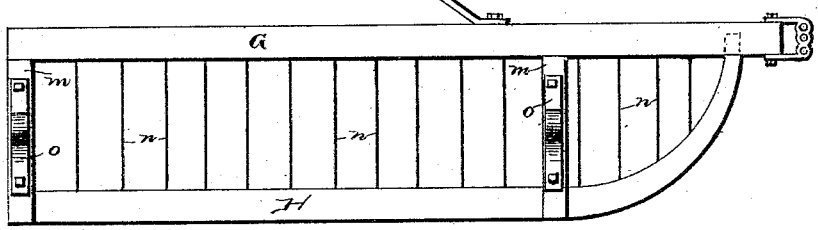
Figure 2:
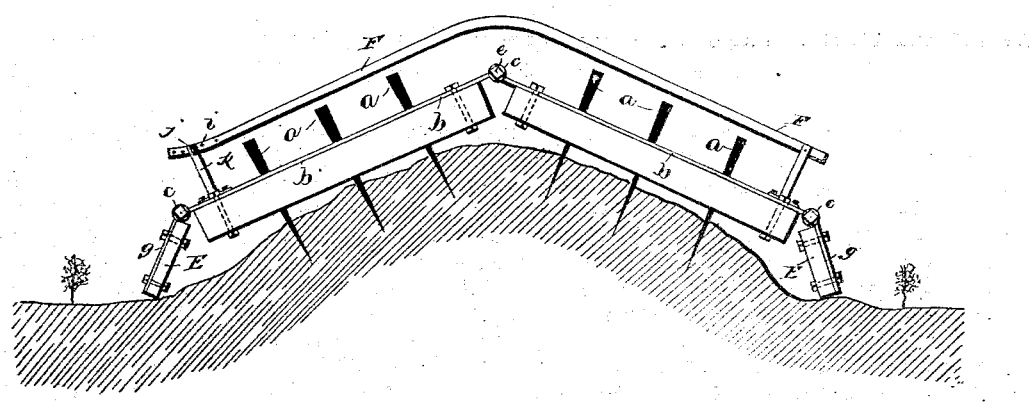
Figure 3:
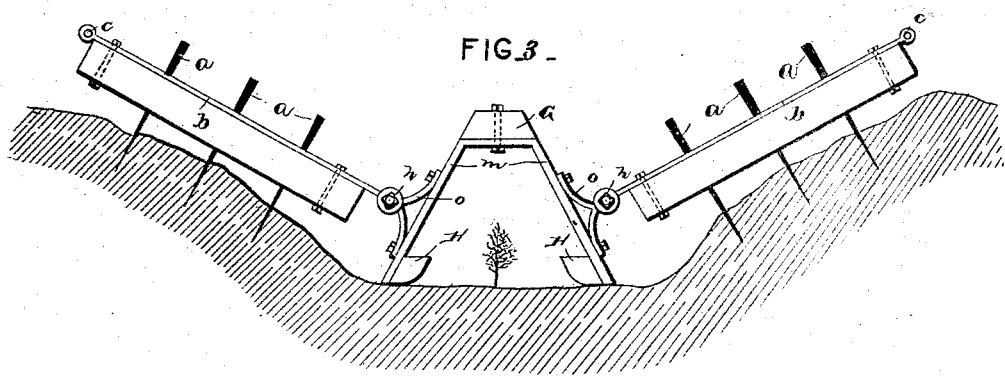

In the accompanying drawings, Figure 1 is a plan view of my improved harrow. Fig. 2 is a rear view showing my improvement adjusted for harrowing the opposite sides of a ridge. Fig. 3 is a similar view showing the harrow adjusted for harrowing the adjacent sides of opposite ridges, and Fig. 4 is a side view of the sled.

When my improved harrow is in proper adjustment for harrowing the side of a ridge, it is made up of two sections, each of which consists of inner beam, A, and an outer beam, B, connected and braced by the slanting cross-pieces C, the latter being provided with teeth $a$, the said beams A and B and the pieces C being preferably constructed of wood. To the outer or end pieces, C, are rigidly secured the metallic bars $b$, extending beyond the beams A B, and provided in their ends with the loops $c$, through the inner of which passes a central bar, D, thus pivotally securing the two sections together, the said bar D being provided on one end with a ring or hook, $d$, for attachment to the draft-chain, and on the opposite end with a screw-thread, on which is adapted to fit a nut, $e$, to prevent the bar from pulling out. To the outer beams, B, are secured wooden guards E, to which are fastened the hinges $g$, through which and the loops $c$ on the outer ends of the bars $b$ pass the rods $h$, thus allowing the guards to swing independently of the sections of the harrow.

To the outer beam, B, of one section of the harrow is movably secured one end of a curved metallic adjusting-bar, F, the other end of which is provided with a series of perforations, $i$, through which is adapted to pass a key or bolt, $j$, the latter also passing through the metal strap $k$, rigidly secured to the outer beam, B, of the opposite harrow-section, the bolt or key $j$ being provided on the end with a lock-nut, $l$. By this arrangement the sections of the harrow may be locked in different angular adjustments, in accordance with the size of the ridge. When the harrow is in this adjustment, the two sections are adapted to travel on opposite sides of a ridge, as shown in Fig. 2 of the drawings, the guards E, running along the ground, preventing the dirt from falling in the furrows and injuring the plants.

When it is desired to adjust the harrow to operate in a furrow or between two ridges, the bars D and the bars $h$ are withdrawn, thereby separating the two sections and releasing the guards from the sections, the latter being then secured to the sides of the sled, which is constructed as follows: G represents the central beam, to which are secured the runners H, the latter being strengthened and held in position by means of braces $m$. To the beam G and runners H are secured the bars $n$, Fig. 4, or, if desired, wire-netting might be used, for a purpose to be hereinafter described. To the braces $m$ are adjustably secured the bracket-bearings $o$, through which and through the loops $c$ pass the rods $h$, thereby pivotally securing the sections of the harrow to the sled. When in operation, the sled moves along in the furrows between the ridges, passes over the plants therein, and guards them against injury from falling clods of earth by means of the bars or wire-netting $n$, and the harrow-sections travel along the sides of the ridges, as shown in Fig. 3 of the drawings.

This device is simple in construction, can be easily and readily adjusted and readjusted, and can be manufactured at a small initial cost.

Having fully described my invention, what I claim as new, and desire to secure by Letters Patent, is—

1. The combination, with a harrow consisting, essentially, of two sections, of loops upon the opposite side edges of each section adapted for the attachment of guards either to the inner or outer side edges of both sections, substantially as set forth.

2. In a harrow, the combination, with a central rod and two harrow-sections pivoted to said rod on opposite sides thereof, of a depending guard pivotally secured to the outer side edge of each harrow-section.

3. In a harrow, the combination, with a central rod, two harrow-sections pivoted to said rod on opposite sides thereof, and a bar pivotally secured to one section and adjustably secured to the other section, of a depending guard pivotally secured to the outer side edge of each harrow-section.

4. In a harrow, the combination, with two harrow-sections pivoted together, of a depending guard pivotally secured to the outer side edge of each harrow-section.

In testimony whereof I have signed this specification in the presence of two subscribing witnesses.

GEORGE GUSTAVE SEEGER.

Witnesses:
W. M. COATS,
O. P. BURK.